United States Patent
Duan et al.

(10) Patent No.: US 11,429,581 B2
(45) Date of Patent: Aug. 30, 2022

(54) SPATIAL-TEMPORAL QUERY FOR COGNITIVE IOT CONTEXTS

(71) Applicant: INTERNATIONAL BUSINESS MACHINES CORPORATION, Armonk, NY (US)

(72) Inventors: Ning Duan, Beijing (CN); Chun Yang Ma, Beijing (CN); Makoto Tanibayashi, Tokyo (JP); Zhi Hu Wang, Beijing (CN); Shoichiro Watanabe, Tokyo (JP); Nan Xia, Sunnyvale, CA (US); Xin Zhang, Beijing (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 15/829,857

(22) Filed: Dec. 1, 2017

(65) Prior Publication Data

US 2019/0171737 A1   Jun. 6, 2019

(51) Int. Cl.
*G06F 16/22* (2019.01)
*G06F 16/27* (2019.01)
(Continued)

(52) U.S. Cl.
CPC ...... *G06F 16/2264* (2019.01); *G06F 16/2365* (2019.01); *G06F 16/278* (2019.01); *G06F 16/283* (2019.01)

(58) Field of Classification Search
CPC ............. G06F 16/2264; G06F 16/2365; G06F 16/283; G06F 16/278
See application file for complete search history.

(56) References Cited

U.S. PATENT DOCUMENTS 7,337,163 B1 * 2/2008 Srinivasan .......... G06F 16/2453
9,613,055 B2   4/2017 Tyercha et al.
(Continued)

FOREIGN PATENT DOCUMENTS

CN   105426491 A   3/2016
CN   104008212 B   5/2017

OTHER PUBLICATIONS

J.K. Lawder, Querying Multi-dimensional Data Indexed Using the Hilbert Space-Filling Curve, Mar. 2001, ACM SIGMOD Record, vol. 30, No. 1 (Year: 2001).*
(Continued)

*Primary Examiner* — Mariela Reyes
*Assistant Examiner* — Fernando M Mari Valcarcel
(74) *Attorney, Agent, or Firm* — Intelletek Law Group, PLLC; Gabriel Daniel, Esq.

(57) ABSTRACT

A method and/or system for managing a database that stores space-time context objects is provided. The system receives a query range in a multi-dimensional space. The system maps the query range into a set of fragments of a space-filling curve that fills the multi-dimensional space in all dimensions of the multi-dimensional space. The system uses each mapped fragment in the set of mapped fragments as a key to query the database for space-time context objects that are mapped to the space-filling curve. The system queries the database by identifying one or more context objects that intersect the mapped fragment at the space-filling curve.

17 Claims, 10 Drawing Sheets

(51) Int. Cl.
  *G06F 16/28* (2019.01)
  *G06F 16/23* (2019.01)

(56) References Cited

U.S. PATENT DOCUMENTS

| | | | | |
|---|---|---|---|---|
| 2010/0161569 A1* | 6/2010 | Schreter | ............. | G06F 16/2246 |
| | | | | 707/696 |
| 2012/0197911 A1* | 8/2012 | Banka | .................. | G06F 16/951 |
| | | | | 707/754 |
| 2014/0232726 A1* | 8/2014 | Nakadai | ................ | G06F 16/283 |
| | | | | 345/440 |
| 2015/0324399 A1* | 11/2015 | Tyercha | ................ | G06F 16/221 |
| | | | | 707/792 |
| 2016/0004762 A1* | 1/2016 | Tyercha | ................ | G06F 16/221 |
| | | | | 707/737 |

OTHER PUBLICATIONS

J.K. Lawder, Querying Multi-dimensional Data Indexed Using the Hilbert Space-Filling Curve, Mar. 2001, ACM SIGMOD Record, vol. 30, No. 1 (Year: 2001) (Year: 2001).*
Querying Multi-dimensional Data Indexed Using the Hilbert Space-Filling Curve, J.K. Lawder& P.J.H. King Mar. 2001 (Year: 2001).*
Pfoser et al., "Indexing of Network-Constrained Moving Objects," 14 pages.
Chen et al., "Spatio-temporal Queries in HBase," 2015 IEEE International Conference on Big Data (Big Data), pp. 1868-1876.

* cited by examiner

891

H-order of next level

| | | 0: | 1: | 2: | 3: | 4: | 5: | 6: | 7: |
|---|---|---|---|---|---|---|---|---|---|
| H-order of current level | 0: | 0 | 0 | 0 | 0 | 1 | 1 | 1 | 1 |
| | 1: | 0 | 1 | 1 | 0 | 0 | 1 | 1 | 0 |
| | 2: | 0 | 1 | 1 | 0 | 0 | 1 | 1 | 0 |
| | 3: | 1 | 1 | 1 | 1 | 0 | 0 | 0 | 0 |
| | 4: | 0 | 0 | 0 | 0 | 1 | 1 | 1 | 1 |
| | 5: | 0 | 1 | 1 | 0 | 0 | 1 | 1 | 0 |
| | 6: | 0 | 1 | 1 | 0 | 0 | 1 | 1 | 0 |
| | 7: | 1 | 1 | 1 | 1 | 0 | 0 | 0 | 0 |

X1 coordinate

892

H-order of next level

| | | 0: | 1: | 2: | 3: | 4: | 5: | 6: | 7: |
|---|---|---|---|---|---|---|---|---|---|
| H-order of current level | 0: | 0 | 0 | 1 | 1 | 1 | 1 | 0 | 0 |
| | 1: | 0 | 0 | 0 | 0 | 1 | 1 | 1 | 1 |
| | 2: | 0 | 0 | 1 | 1 | 1 | 1 | 0 | 0 |
| | 3: | 0 | 0 | 1 | 1 | 1 | 1 | 0 | 0 |
| | 4: | 0 | 0 | 1 | 1 | 1 | 1 | 0 | 0 |
| | 5: | 0 | 0 | 0 | 0 | 1 | 1 | 1 | 1 |
| | 6: | 1 | 1 | 1 | 1 | 0 | 0 | 0 | 0 |
| | 7: | 0 | 0 | 1 | 1 | 1 | 1 | 0 | 0 |

X2 coordinate

893

H-order of next level

| | | 0: | 1: | 2: | 3: | 4: | 5: | 6: | 7: |
|---|---|---|---|---|---|---|---|---|---|
| H-order of current level | 0: | 0 | 1 | 1 | 0 | 0 | 1 | 1 | 0 |
| | 1: | 0 | 0 | 1 | 1 | 1 | 1 | 0 | 0 |
| | 2: | 0 | 0 | 0 | 0 | 1 | 1 | 1 | 1 |
| | 3: | 1 | 0 | 0 | 1 | 1 | 0 | 0 | 1 |
| | 4: | 0 | 1 | 1 | 0 | 0 | 1 | 1 | 0 |
| | 5: | 0 | 0 | 0 | 0 | 1 | 1 | 1 | 1 |
| | 6: | 1 | 1 | 0 | 0 | 0 | 0 | 1 | 1 |
| | 7: | 1 | 0 | 0 | 1 | 1 | 0 | 0 | 1 |

X3 coordinate

*FIG. 8*

SPATIAL-TEMPORAL QUERY FOR COGNITIVE IOT CONTEXTS

BACKGROUND

Technical Field

The present disclosure generally relates to database management.

Description of the Related Art

Internet of things (IoT) is a network of physical devices, vehicles, home appliances, and other items embedded with software, sensors, actuators, and network connectivity which enable these objects to connect and exchange data. In IoT, the space and time position of a thing provides critical space-time context that allows a person or device processing the information about the thing to decide whether that information was important to the action being taken, and if so, add the missing information or decide to not take the action. Challenges for IoT implementations include the constraints of variable spatial scales, the need to handle massive amounts of data, and indexing for fast search and neighbor operations.

SUMMARY

Some embodiments of the disclosure provide a method and/or system for managing a database that stores space-time context objects. The system receives a query range in a multi-dimensional space. The system maps the query range into a set of fragments of a space-filling curve that fills the multi-dimensional space in all dimensions of the multi-dimensional space. The system uses each mapped fragment in the set of mapped fragments as a key to query the database for space-time context objects that are mapped to the space-filling curve. The system queries the database by identifying one or more context objects that intersect the mapped fragment at the space-filling curve. The system optimizes the set of fragments by reducing the number of fragments in the set of fragments by identifying and combining fragments that intersect or neighbor each other in the space-filling curve.

In some embodiments, the multi-dimensional space comprises two spatial dimensions and one temporal dimension, wherein the space-filling curve is a three-dimensional (3D) Hilbert space-filling curve.

In some embodiments, the multi-dimensional space is recursively partitioned into a hierarchy of partitions at multiple levels. Each level of partitions includes partitions that are ordered according to the space-filling curve. Each partition of a level is sub-divided into a further level of partitions. Each code value in the sequence identifies the ordering of a partition at a corresponding level of the hierarchy.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 8 includes tables that specify, for each current level partition, the location of the eight next level partitions with respect to the X1, X2, and X3 axis, consistent with an exemplary embodiment.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

In Internet of Things (IoT) scenarios, there are many types of information being exchanged, such as road network, land usage, traffic condition, weather, air quality, etc. The importance of these types of information depends heavily on their space-time contexts. From a spatial perspective, contexts specify geometries such as point, line, polygon, grid, etc. For a temporal perspective, contexts specify changes in positions and/or spatial geometries at different instances in time.

For some IoT systems, the information for IoT are stored and indexed as targets in a database according to the space-time contexts of the targets. (A database target is therefore also referred to as a context object). To query database targets with stationary contexts (e.g., information of a fixed location), the system may map a query range into a set of corresponding spatial encodes and uses the mapped spatial encodes to fetch current status for targets having spatial contexts that fall with the query range. An example of the spatial encode is GeoHash, which is a hierarchical spatial data structure that subdivides two-dimensional space according to a space-filling curve. On the other hand, to query database targets with moving context (such as for a moving object), the system may perform a series of spatial queries for context objects across a range of time. This can result in a large number of queries, since the scale level of the query and the scale level of the context objects are not optimized in time dimension.

Some embodiments of the disclosure provide a method and/or system for managing a database that stores space-time context objects. The system receives a query range in a multi-dimensional space. The system maps the query range into a set of fragments of a space-filling curve that fills the multi-dimensional space in all dimensions of the multi-dimensional space. The system uses each mapped fragment in the set of mapped fragments as a key to query the database for space-time context objects that are mapped to the space-filling curve. The system queries the database by identifying one or more context objects that intersect the mapped fragment at the space-filling curve.

Figure 1:
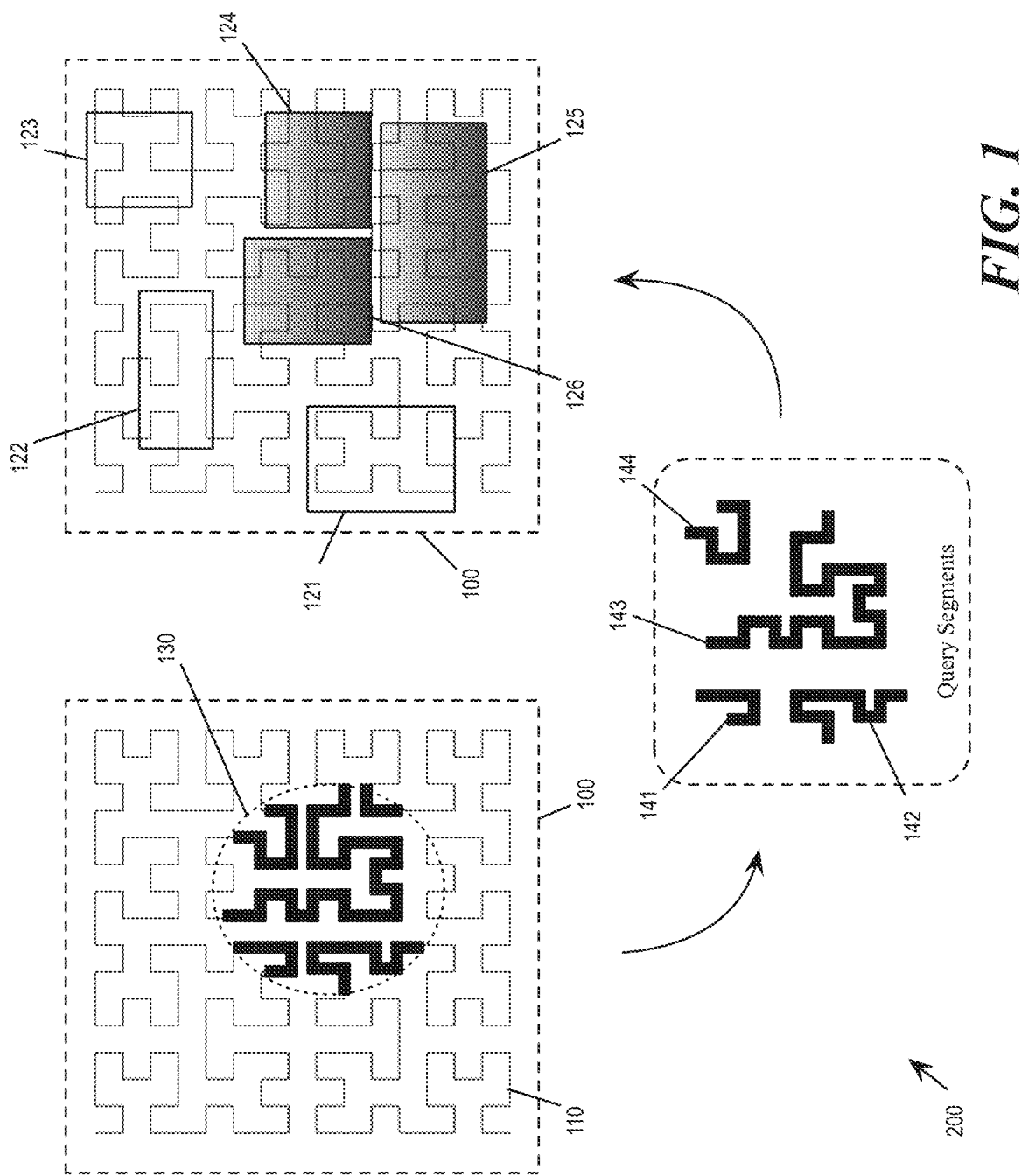
FIG. 1 conceptually illustrates querying context objects in a multi-dimensional space, consistent with an exemplary embodiment.

FIG. 1 conceptually illustrates querying context objects in a multi-dimensional space 100, consistent with an exemplary embodiment. The figure illustrates a database system 200 having context objects (i.e., database targets indexed by space-time contexts) 121-126 that occupy various parts of the multi-dimensional space 100. The database system receives a query request based on a query range 130 in the multi-dimensional space 100.

The multi-dimensional space 100 is conceptually illustrated as a two-dimensional space. One of ordinary skill would understand that the multi-dimensional space may have one or more spatial dimensions and one temporal dimension. The multi-dimensional space 100 is filled by a space-filling curve 110. The space-filling curve 110 is one continuous curve that traverses through the entire multi-dimensional space. The space-filling curve 110 illustrated in FIG. 1 is a Hilbert space-filling curve, however, other types of space-filling curves are also possible.

The database system maps the query range 130 into a set of query fragments 141-144. The fragments 141-144 are segments of the space-filling curve 110, each fragment being a continuous section of the space-filling curve that fall within the query range 130. The database system performs the query by using the query segments to identify and fetch context objects in the database. Specifically, the query identifies and fetches context objects having space-time contexts that fall within or intersects any of the query segments. In the example of FIG. 1, the space-time objects 124-126 intersect the fragments 141-144. The database system would provide the content of the identified context objects as query response. In some embodiments, the context objects are also mapped to the space-filling curve 110. For example, each context object is indexed in the database according to the position of the context object in the space-filling curve 110. The database system can therefore access the context objects based on correspondence between the positions of the query segments and the positions of the context objects in the space-filling curve 110.

In some embodiments, each query segment corresponds to one query operation. Hence, in the example of FIG. 1, the database system performs four query operations based on the four query segments 141-144. The database system improves the performance of space-time context search by having fewer query operations. Mapping the query range to the space-filling curve makes it more likely that all context objects within the query range be identified with fewer query segments.

Figure 2:
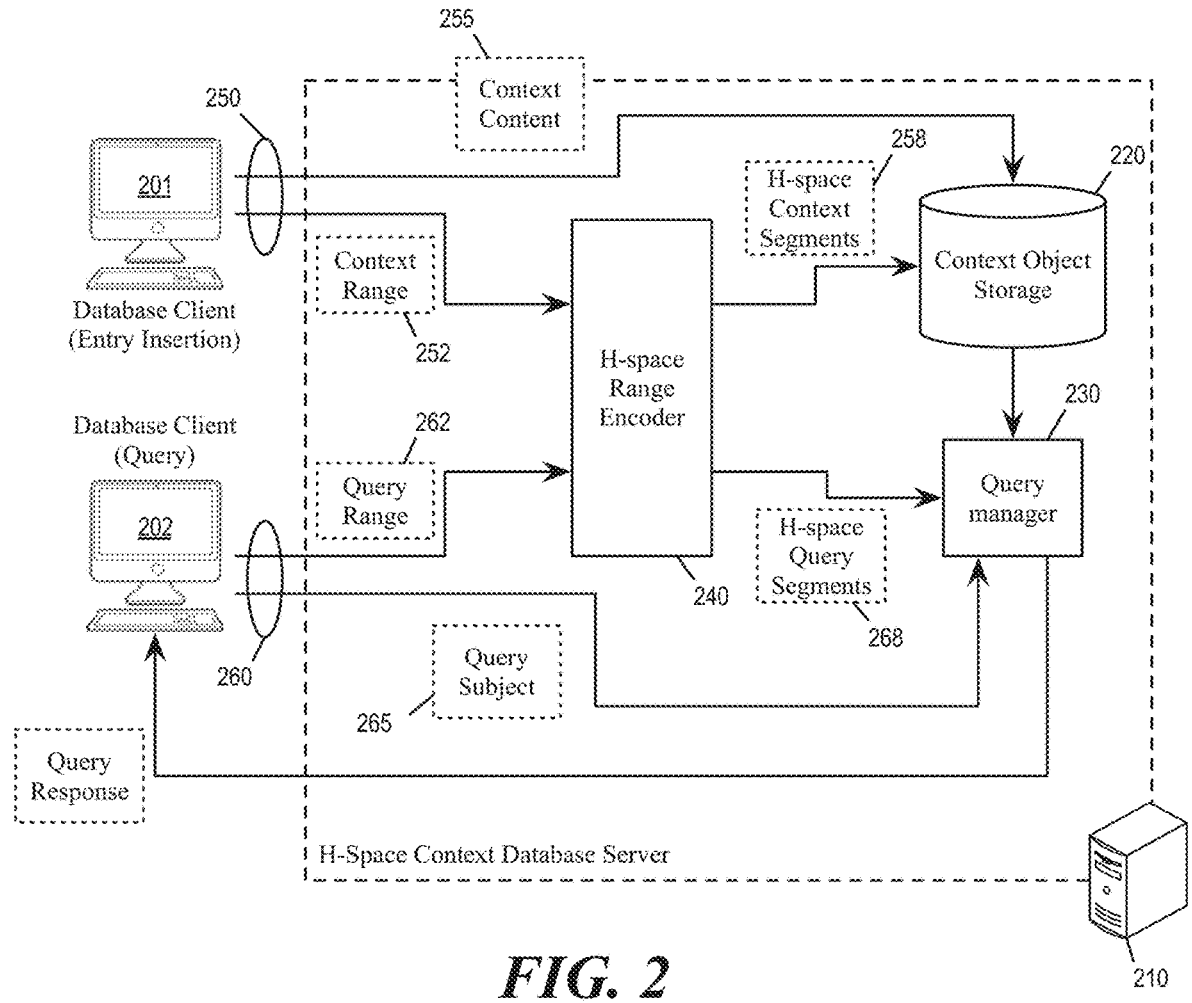
FIG. 2 illustrates a computing device or electronic apparatus that implement the database system, consistent with an exemplary embodiment.

FIG. 2 illustrates a computing device or electronic apparatus 210 that implements the database system 200, consistent with an exemplary embodiment. The computing device 210 is a context database server that handles insertion and query of context objects. The computing device 210 handles insertion requests from client devices 201 for inserting context objects into the database as well as query requests from client devices 202 for accessing context objects in the database. The context objects in the database are indexed according to their positions in the space-filling curve. For some embodiments in which the space-filling curve is a Hilbert curve, space-time references such as query ranges or query fragments are encoded in Hilbert space and can be said to be H-space encoded or H-encoded.

As illustrated, the computing device 210 includes context object storage 220, a query manager 230, and a H-space range encoder 240. In some embodiments, the context object storage 220, the query manager 230, and the H-space range encoder 240 are modules of software instructions being executed by one or more processing units (e.g., a processor) of the computing device 210. In some embodiments, the modules 220, 230, and 240 are modules of hardware circuits implemented by one or more integrated circuits (ICs) of an electronic apparatus. Though the modules 220, 230, and 240 are illustrated as being separate modules, some of the modules can be combined into a single module.

Figure 4:
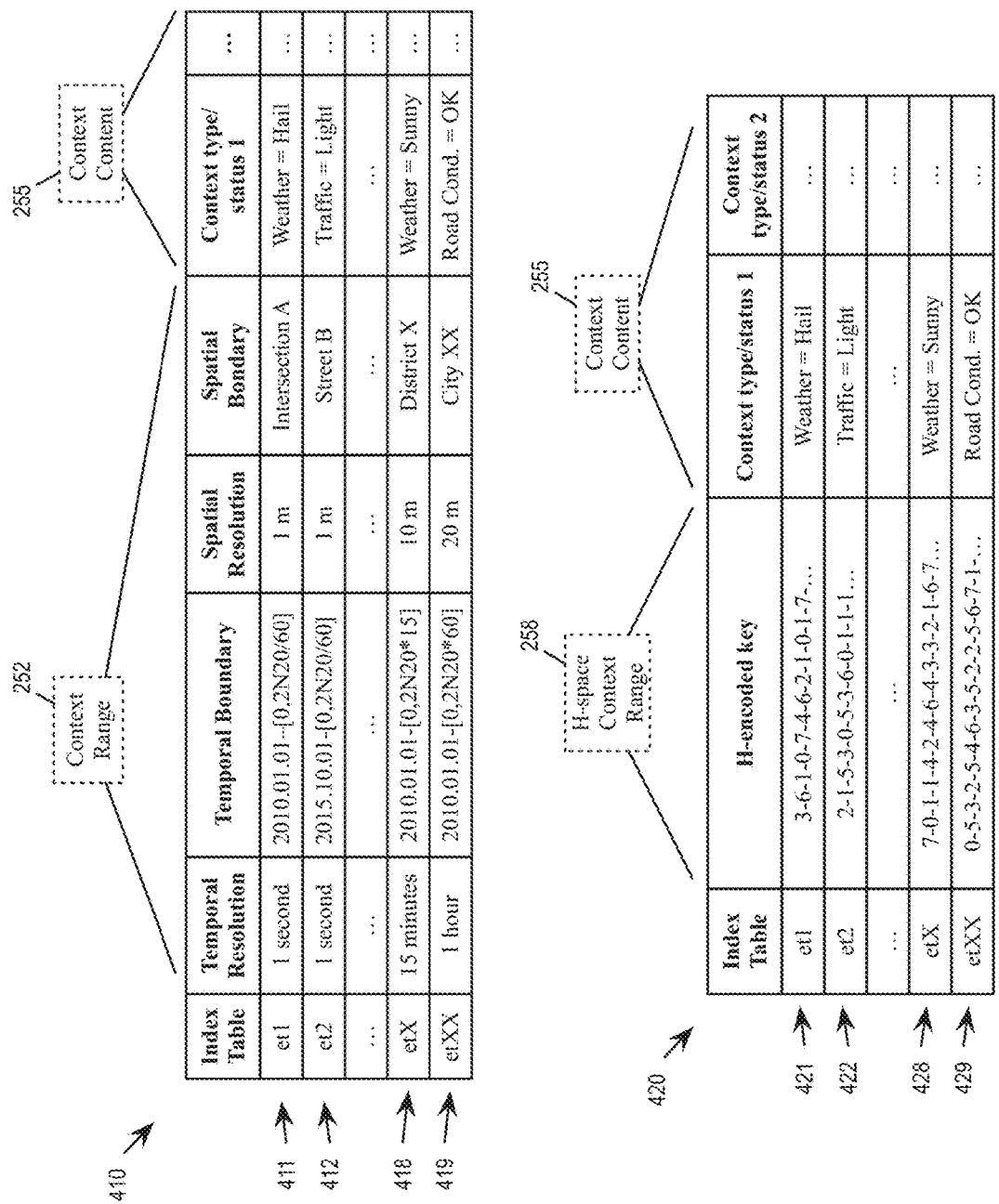
FIG. 4 illustrates example context objects being stored in the database.

The computing device 210 may receive insertion requests 250 from the client devices 201 to insert context objects into the database. Each insertion request includes a context range 252 and a set of context content 255. The H-space range encoder 240 maps the context range 252 into a set of H-encoded context segments 258. The context content 255 and the H-space context segments are stored into the context object storage 220. FIG. 4 below includes examples of context range, context content, and H-encoded context segments.

The computing device 210 may receive query requests 260 from the client devices 202 for context objects in the database. Each query request 260 includes a query range 262 and a query subject 265. The H-space range encoder 240 maps the query range 262 into a set of H-encoded query segments 268. The query manager 230 uses the H-space query segments 268 and the query subject 265 to identify and retrieve matching context objects from the context object storage 220. The mapping of context range and/or query range into fragments along the space-filling curve (e.g., H-space encoding) will be described by reference to FIG. 6 and FIG. 9 below.

Figure 3:
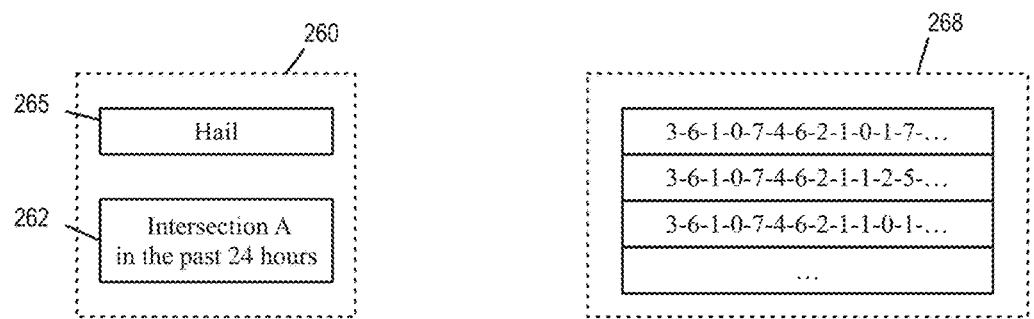
FIG. 3 illustrates exemplary content of the query request and the H-encoded query segments.

FIG. 3 illustrates exemplary content of the query request 260 and the H-encoded query segments 268. The example query request 260 is for "Hail at intersection A in the past 24 hours". The subject 265 of the query is occurrence of "hail". The range 262 of the query is defined to be Intersection A in the past 24 hours. In other words, the query is for context objects having "hail" in its content with spatial range "intersection A" and temporal range "past 24 hours".

The database system 200 maps the query range 262 into the set of query fragments 268 along the space-filling curve of the multi-dimension space. Each query fragment 268 is specified by a sequence of code values that identifies a position in the space-filling curve. In some embodiments, the multi-dimensional space is recursively partitioned into a hierarchy of partitions at multiple levels. Each level of partitions includes partitions that are ordered according to the space-filling curve. Each partition of a level is sub-divided into a further level of partitions. Each code value in the sequence identifies the ordering of a partition at a corresponding level of the hierarchy. The recursive partitioning of the multi-dimension space based on the space-filling curve will be further described by reference to FIG. 5 and FIG. 7 below.

FIG. 4 illustrates example context objects being stored in the database. The figure includes a raw context table 410 and an H-encoded context table 420. The raw context table 410 lists context objects 411-419 as originally entered by the client devices 201 without being H-encoded. The context objects listed in the table 410 includes fields such as temporal resolution, temporal boundary, spatial resolution, spatial boundary, context type/status 1, context type/status 2, etc.

The temporal resolution field, temporal boundary field, spatial resolution field, and spatial boundary field correspond to the context range 252. The contexts of these objects are specified by their positions in ordinary multi-dimensional space rather than their H-encoded positions in the space-filling curve. For example, the context object 411 has temporal boundary/position specified in terms of year (2010), month (January), day (first), hour, minute, and seconds. The resolution of the temporal specification of the context object 411 is one second. The context object 411 has spatial boundary/position specified to be a particular intersection (intersection A). The resolution of the spatial specification is one meter. The spatial boundary may also be specified by using latitude and altitude.

The context type/status 1 field, context status 2 field, etc. correspond to context content 255. As illustrated, each context object has one or more sets of type and status as the content of the context object. Each set of type and status is used to match the subject of the query requests. For example, the context object 411 includes "weather" as a type and "hail" as a corresponding status, which makes the context object 411 a possible match for query subject "hail".

The H-encoded context table 420 lists context objects 421-429 in H-encoded form so the context objects can be indexed and queried by positions along the space-filling curve. The H-encoded context objects are based on the H-space context range 258, which are H-encoded versions of the context range 252 produced by the H-space range encoder 240. As illustrated, each of the context object 421-429 includes a H-encoded key, which is specified by a sequence of code values that identifies a position in the space-filling curve. In some embodiments, a context object may include a set of one or more H-encoded keys that indicate multiple positions in the space-filling curve, such as to indicate a starting position and an ending position of a fragment in the space-filling curve, or to indicate several different fragments in the space-filling curve. The set of H-encoded keys of a context object forms an index table for the context object. As illustrated, each context object in the table 410 and the table 420 is listed with an identifier of its index table. (For example, the index table identifier for the context object 411 and 421 is "et1", indicating that the context object 421 is a H-encoded version of the context object 411.)

In some embodiments, the multi-dimension space is recursively partitioned into a hierarchy of partitions at multiple different levels. Each partition is sub-divided into a further level of partitions. Each level of partitions includes partitions that are ordered according to the space-filling curve. In some of these embodiments, the sequence of code values that identifies a position in the space-filling curve for query fragments and/or H-encoded keys corresponds to a path of traversal through the hierarchy of levels, with each code value identifying a partition at a level of the hierarchy.

Figure 5:
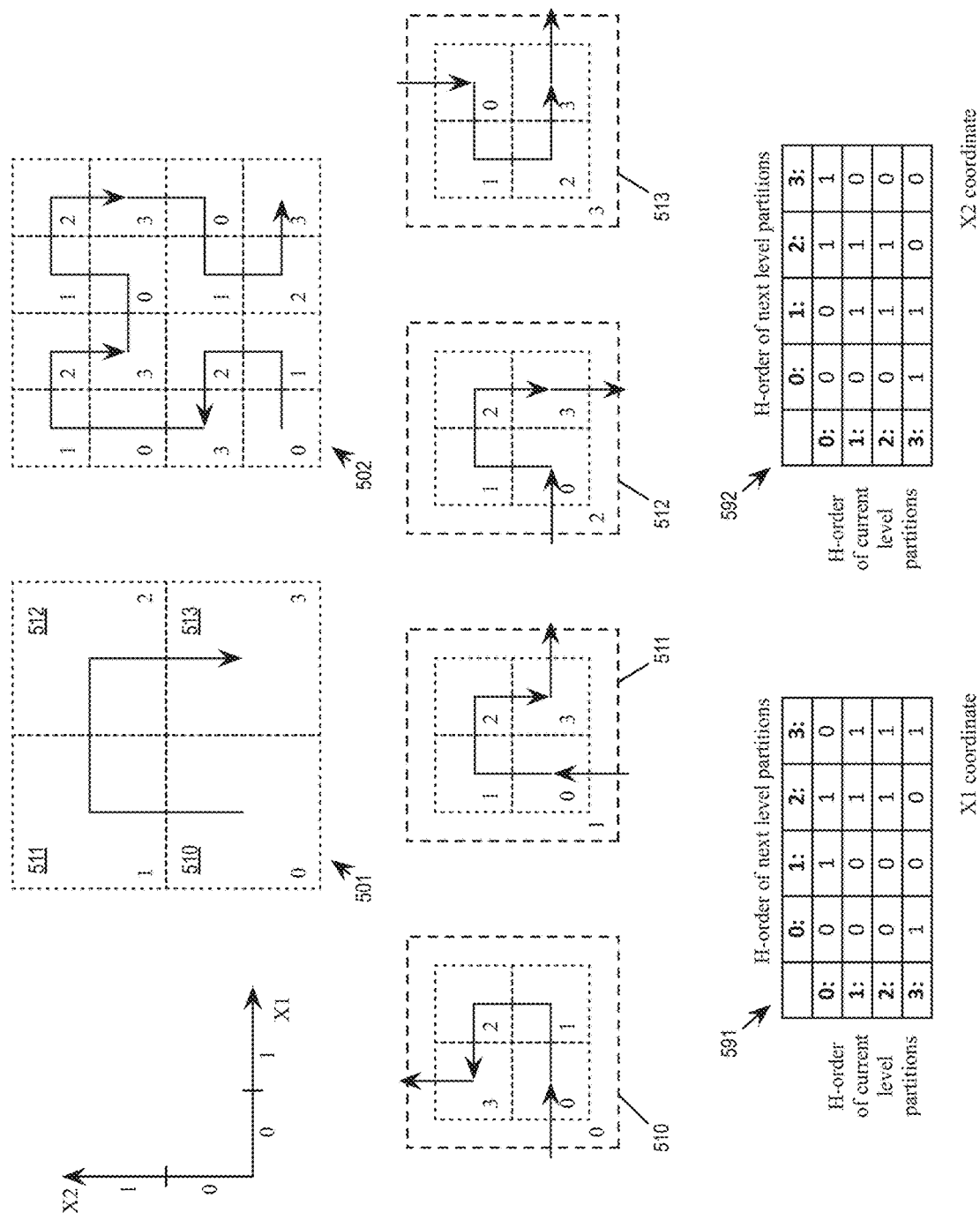
FIG. 5 illustrates the recursive partitioning of the multi-dimensional space, consistent with an exemplary embodiment.

FIG. 5 illustrates the recursive partitioning of the multi-dimensional space, consistent with an exemplary embodiment. The recursive partitioning corresponds to increasing level of the space-filling curve, e.g., to higher orders of the Hilbert curve. In this example, the multi-dimensional space is illustrated as a two-dimensional space having a X1 axis and a X2 axis. (X1 axis can be a spatial axis while the X2 axis can be a temporal axis).

At the first or root level 501, the multi-dimensional space 100 is divided into four partitions 510-513. The partitions are numbered 0, 1, 2, and 3. These numbers correspond to the ordering by which the space-filling curve 110 traverses through the partitions 510-513. The path of the space-filling curve 110 traversing through the partitions at the first level corresponds to a first order 2D Hilbert Curve.

At the second level 502, each of the four partitions 510-513 are further sub-divided into four sub-partitions. The sub-partitions of each partition are also numbered according to the ordering by which the space-filling curve 110 traverses through the sub-partitions. As illustrated, the four sub-partitions of the partition 510 are numbered 0 through 3 according to the order by which the space-filling curve traverse through the sub-partitions of the partition 510, the four sub-partitions of the partition 511 are numbered 0 through 3 according to the order by which the space-filling curve traverse through the sub-partitions of the partition 511, etc. The path of the space-filling curve 110 traversing through the partitions and their respective sub-partitions at the second level corresponds to a second order 2D Hilbert Curve.

Though not illustrated, each sub-partition is further recursively divided into further sub-sub-partitions, and each of the sub-sub-partitions are also numbered according to the order by which the space-filling curve traverses through the sub-sub-partitions in the sub-partition, so on and so forth.

It is worth noting that, for partitions having different order values, the space-filling curve takes different paths to travel through the sub-partitions of the partition. Specifically, the locations of each next level partitions (sub-partition) of a current level partition (partition) are dependent on the order value of the current level partition and the order value of the next level partition. As illustrated, the orderings of the sub-partitions in partitions 510, 511, and 513 are different (the ordering of the sub-partitions in partition 512 is the same as the partition 511).

FIG. 5 includes tables 591 and 592 that specify, for each current level partition, the location of the four next level partitions with respect to X1 axis and X2 axis (a location along the X1 axis or X2 axis can be either 0 or 1).

Figure 6:
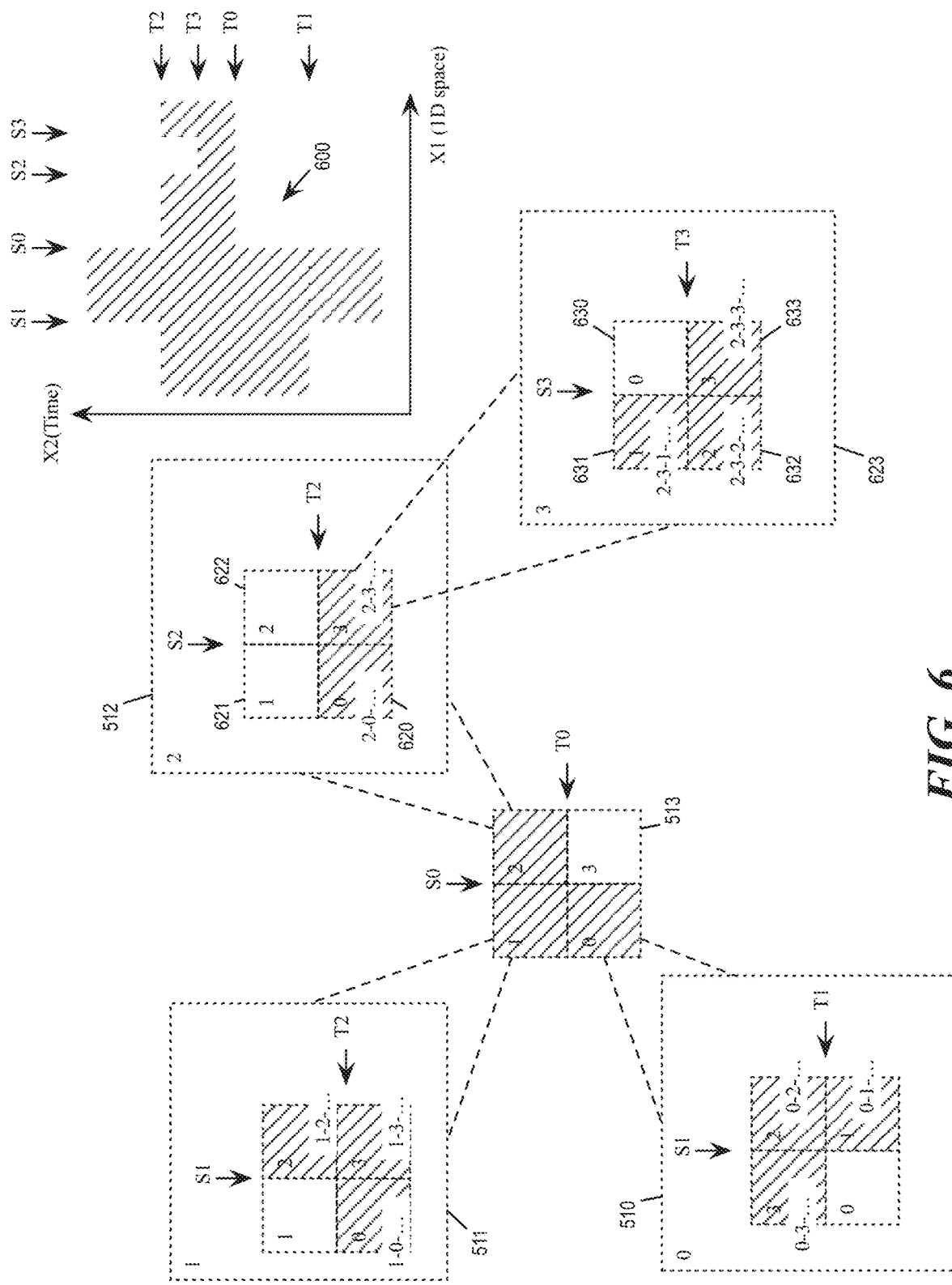
FIG. 6 conceptually illustrates operations to map a space-time range to fragments of the space-filling curve, consistent with an exemplary embodiment.

FIG. 6 conceptually illustrates operations to map a space-time range to fragments of the space-filling curve, consistent with an exemplary embodiment. The mapping operation recursively traverses through the hierarchy of partitions to identify partitions that intersect the space-time range. The figure illustrates a space-time range 600 that can be a query range or a context range. The range 600 spans several spatial positions, including S0, S1, S2, and S3. The range also spans several temporal positions, including T0, T1, T2, and T3.

As illustrated, at the first level 501, the multi-dimensional space is divided along spatial position S0 and temporal position T0 into the four partitions 510-513. The partition 510, 511, and 512 intersect the range 600 (illustrated as shaded) while the partition 513 does not intersect the range 600.

The mapping operation traverses to the next level of hierarchy for the partitions 510, 511, and 512. The mapping operation does not traverse to next level of hierarchy for the partition 513 because the partition 513 does not intersect the range 600. The partition 510 is divided along spatial position S1 and temporal position T1. The partition 511 is divided along spatial position S1 and temporal position T2. The partition 512 is divided along spatial position S2 and temporal position T2 (into sub-partitions 620-623).

For each sub-partition, the mapping operation determines whether to traverse the next level based on whether the sub-partition intersects the range 600. For example, the mapping operation traverses the next level of the sub-partition 623 (which has order value 3) of the partition 512. The sub-partition 623 is divided into sub-sub-partitions 630-633, and the mapping operation determines, for each sub-sub-partition, whether to traverse the next level based on whether the sub-sub-partition intersects the range 600, so on and so forth.

As mentioned, each query fragment 268 or context fragments 258 is specified by a sequence of code values (also referred to as H-encoded key) that identifies a position in the space-filling curve, and each code value in the sequence identifies the ordering of a partition at a corresponding level of the hierarchy. A partition or a sub-partition of a given level may represent a portion of the space-time range of the context object or query. Such a partition or sub-partition, and hence the corresponding portion of the query range or context range, can be identified by the path of traversal through the hierarchy from the root level to the level of the partition or sub-partition. For example, the partition 633 can be identified by the sequence of codes 2-3-3. This is because the code value of the partition 512 is 2, the order value of the partition 623 is 3, and the order value of the partition 633 is 3. Likewise, the partition 631 can be identified by the sequence 2-3-1, the partition 632 can be identified by the sequence 2-3-2, the partition 620 can be identified by the sequence 2-0, etc.

Since each partition also corresponds to a position or a fragment in the space-filling curve, the sequence of code representing the partition can also be used to denote a position or a section of the space-filling curve. Furthermore, a fragment of the space-filling curve that spans multiple partitions continuously can be represented by a starting H-encoded key that corresponds to the first partition of the fragment and an ending H-encoded key that corresponds to last partition of the fragment. For example, the partitions 631-633 are continuous partitions in the space-filling curve. The H-encoded key 2-3-1 and the H-encoded key 2-3-3 can therefore serve as the starting and ending H-encoded keys of a fragment that spans partitions 631-633. To generalize, a fragment of the space-filling curve can be represented by a pair of H-encoded keys that represents starting and ending positions. In fact, the entire 2D Hilbert space-filling curve can be considered to have starting point of 0-0-0-0-0- . . . and ending point of 3-3-3-3-3- . . . .

Figure 7:
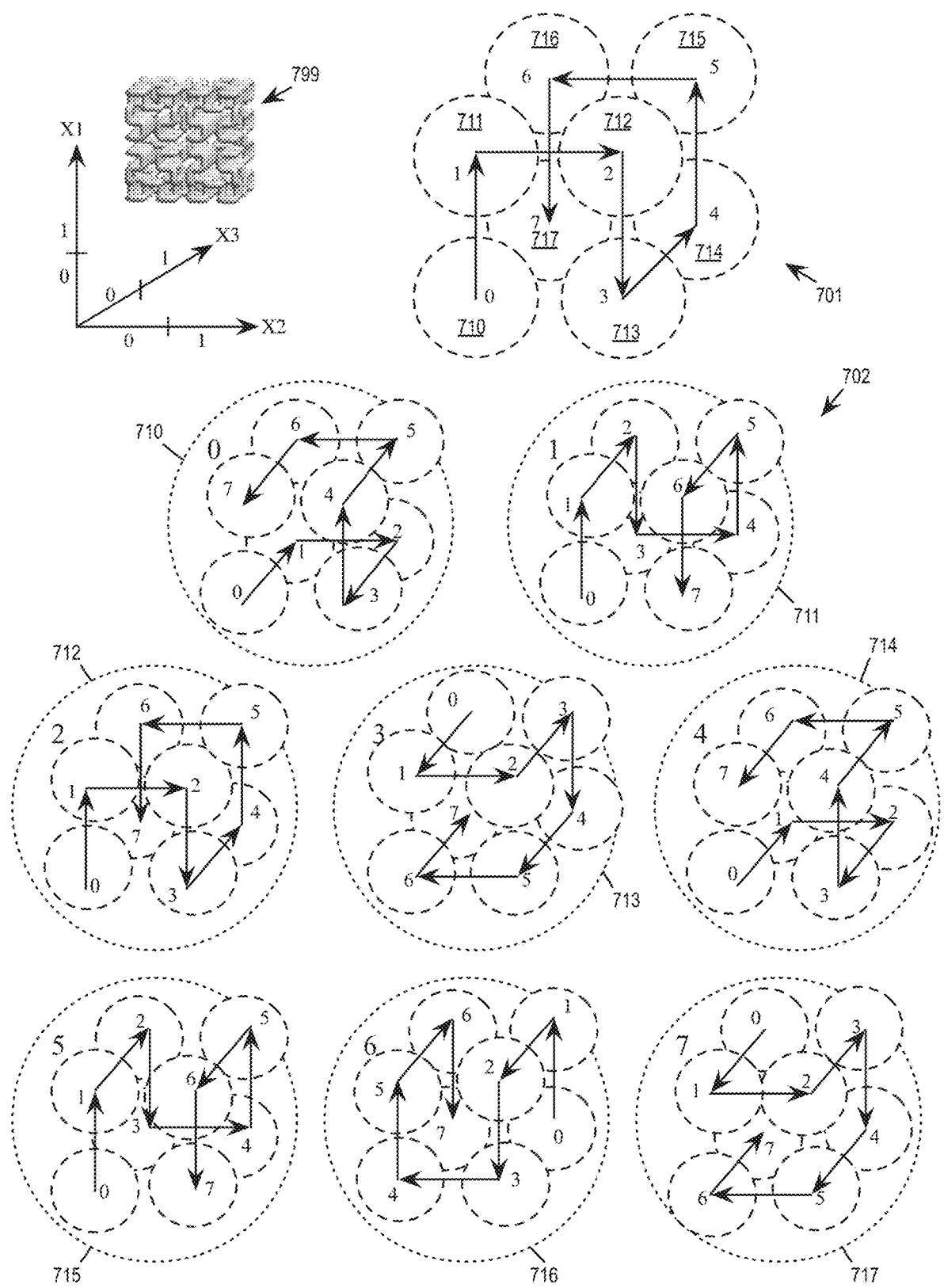
FIG. 7 illustrates the recursive partitioning of a 3D multi-dimensional space, consistent with an exemplary embodiment.

FIG. 5 and FIG. 6 illustrate examples that are two-dimensional. The same principles illustrated can extend to a three-dimensional space, with two spatial dimensions and one temporal dimension. FIG. 7 illustrates the recursive partitioning of a 3D multi-dimensional space, consistent with an exemplary embodiment. The recursive partitioning corresponds to increasing levels of a 3D space-filling curve 799 (e.g., 3D Hilbert curve) that fills the multi-dimensional space. In this example, the multi-dimensional space is illustrated as a three-dimensional space having a X1 axis, a X2 axis, and a X3 axis. Two of the axis (e.g., X1 and X2) corresponds to spatial dimensions while the remaining axis (e.g., X3) corresponds to the temporal dimension.

At the first (or root) level 701, the multi-dimensional space is divided into eight partitions 710-717. The partitions are numbered 0 through 7. These numbers correspond to the ordering by which the space-filling curve 799 traverses through the partitions 710-717. The path of the space-filling curve 799 traversing through the partitions at the first level corresponds to a first order 3D Hilbert Curve.

At the second level 702, each of the partitions 710-717 are further sub-divided into eight sub-partitions. The sub-partitions of each partition are also numbered according to the ordering by which the space-filling curve 779 traverses through the sub-partitions. As illustrated, the eight sub-partitions of the partition 710 are numbered 0 through 7 according to the order by which the space-filling curve 799 traverse through the sub-partitions of the partition 710, the eight sub-partitions of the partition 711 are numbered 0 through 7 according to the order by which the space-filling curve 799 traverse through the sub-partitions of the partition 711, etc. The path of the space-filling curve 799 traversing through the partitions and their respective sub-partitions at the second level corresponds to a second order 3D Hilbert Curve.

Though not illustrated, each sub-partition is further recursively divided into further sub-sub-partitions, and each of the sub-sub-partitions are also numbered according to the order by which the space-filling curve traverse through the sub-sub-partitions in the sub-partition, so on and so forth.

As mentioned above and as illustrated in FIG. 7, for partitions having different order values, the space-filling curve takes different paths to travel through the sub-partitions of the partitions. FIG. 8 includes tables 891, 892, and 893 that specify, for each current level partition, the location of the eight next level partitions with respect to the X1, X2, and X3 axis (the location can be 0 or 1).

Figure 9:
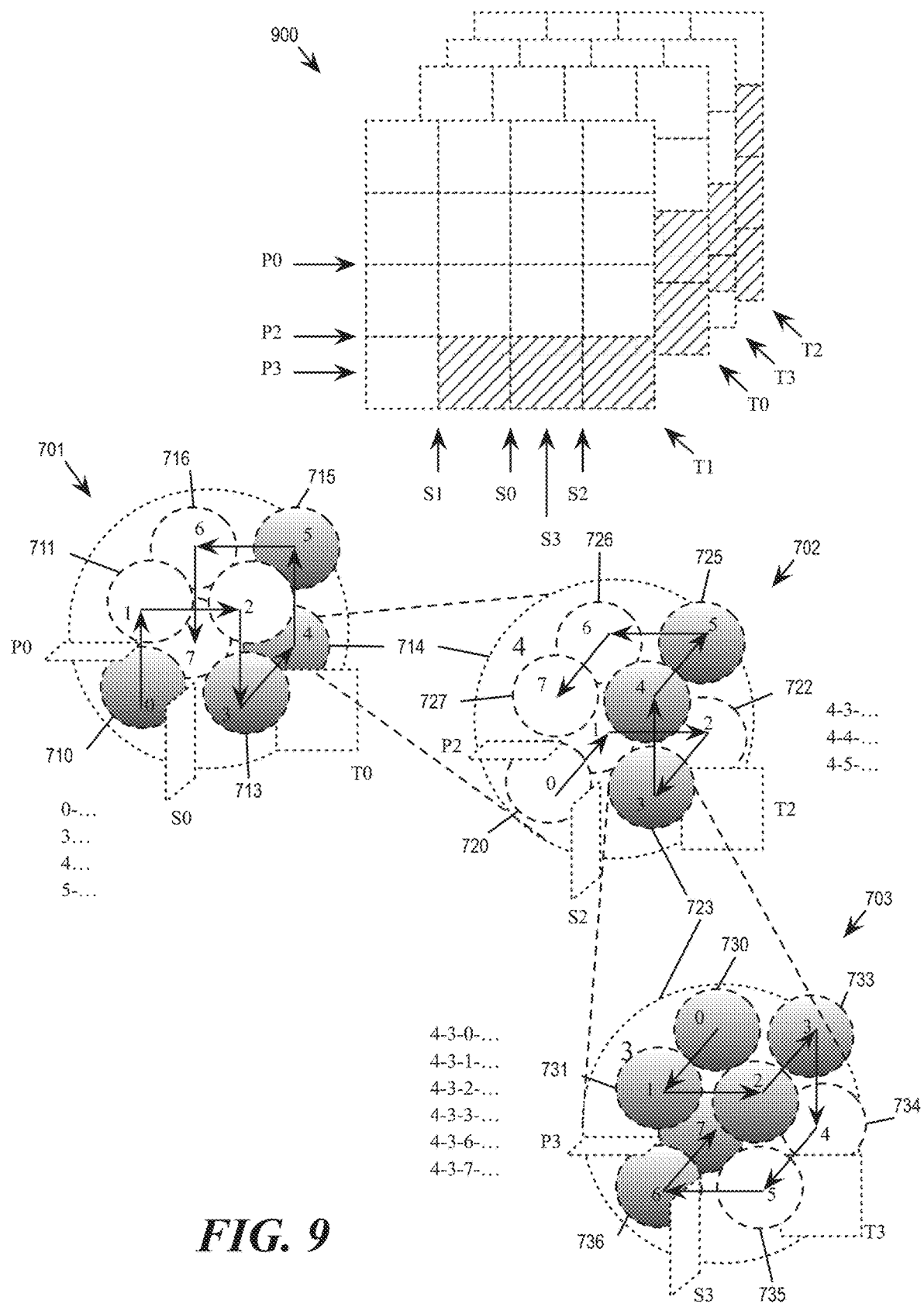
FIG. 9 conceptually illustrates operations to map a query range or a context range to fragments of the space-filling curve by traversing through the hierarchy of partitions in a 3D multi-dimensional space, consistent with an exemplary embodiment.

FIG. 9 conceptually illustrates operations to map a query range or a context range to fragments of the space-filling curve by traversing through the hierarchy of partitions in a 3D multi-dimensional space, consistent with an exemplary embodiment. The figure illustrates a space-time object having a 3D range 900 (shaded portion). The range 900 spans several spatial positions, including S0, S1, S2, and S3. The range 900 also spans several temporal positions, including T0, T1, T2, and T3.

As illustrated, at the first level 701, the multi-dimensional space is divided along spatial positions S0 and P0 and temporal position T0 into the eight partitions 710-717. The partition 710, 713, 714, and 715 intersect the range 900 (illustrated as shaded) while the partitions 711, 716, and 717 do not intersect the range 900.

The mapping operation traverses to the next level of hierarchy for the partitions that intersect the range 900. For illustrative clarity, the figure illustrates only the traversal into the partition 714. The partition 714 is divided along spatial position S2 and temporal position T2 into sub-partitions 720-727.

For each sub-partition, the mapping operation determines whether to traverse the next level based on whether the sub-partition intersects the range 900. For example, the mapping operation traverses the next level of the sub-partition 723 (which has order value 3) of the partition 714. The sub-partition 723 is divided into sub-sub-partitions 730-737, and the mapping operation determines, for each sub-sub-partition, whether to traverse the next level based on whether the sub-sub-partition intersects the range 900, so on and so forth.

As mentioned, a partition or a sub-partition of a given level can be identified by the path of traversal through the hierarchy from the root level to the level of the partition or sub-partition. For example, the partition 736 can be identified by the sequence of codes 4-3-6. This is because that path of recursion from the root node to the partition 736 is 4 (partition 714), 3 (partition 723), and 6 (partition 736). Likewise, the partition 732 can be identified by the sequence 4-3-2, the partition 733 can be identified by the sequence 4-3-3, the partition 725 can be identified by the sequence 4-5, etc. In fact, the entire 3D Hilbert space-filling curve can be considered to have a starting point of 0-0-0-0-0- . . . and ending point of 7-7-7-7-7- . . . .

As mentioned, a continuous fragment of the space-filling curve can be represented by a pair of H-encoded keys that represent starting and ending positions of the fragment. For example, the partitions 730-733 are continuous partitions in the space-filling curve. The H-encoded key 4-3-0 and the H-encoded key 4-3-3 can therefore serve as the starting and ending H-encoded keys of a fragment that spans partitions 730-733. Likewise, the partitions 723-725 are continuous partitions in the space-filling curve. The H-encoded key 4-3 and the H-encoded key 4-5 can therefore serve as the starting and ending H-encoded keys of a fragment that spans partitions 723-725.

In some embodiments, when mapping the range (query range or context range) to a set of fragments, the database system 200 constructs an encoding tree by creating nodes that corresponds to segments of the space-filling curve that encompass at least a portion of the range. The encoding tree includes nodes at different levels of a hierarchy that corresponds to the hierarchy of levels created by the recursive partitioning of the multi-dimensional space as described by reference to FIG. 5 or FIG. 7 above. Each level of an encoding tree based on a 2D space-filling curve would have up to 4 child nodes that correspond to sub-partitions 0 through 3. Each level of an encoding tree based on a 3D space-filling curve would have up to 8 child nodes that correspond sub-partitions 0 through 7. Each mapped fragment corresponds to a sequence of codes that represents a traversal in the encoding tree from a root level of the hierarchy to an acceptable level (based on spatial and/or temporal resolution). Such a sequence of codes, as mentioned earlier, also corresponds to a position or segment in the space-filling curve.

In some embodiments, when constructing the encoding tree for mapping the range, the database system would construct an initial encoding tree based on the spatial information of the context but not the temporal information. The database system would add nodes that correspond to the temporal dimension of the context into the encoding tree based on both spatial and temporal dimensions. For example, for a multi-dimension space have one spatial dimension and one temporal dimension, the database system would construct a binary spatial encoding tree by binary partitioning, then add temporal nodes to the spatial encoding tree based on 2D Hilbert curve by using e.g., the table 592, which specifies the location of the four partitions with respect to the X2 axis. As another example, for a multi-dimension space have two spatial dimensions and one temporal dimension, the database system would construct a spatial encoding tree based on GeoHash or 2D Hilbert curve, then add temporal nodes to the spatial encoding tree based on 3D Hilbert curve by using e.g., the table 893, which specifies the location of the eight partitions with respect to the X3 axis.

Figure 10:
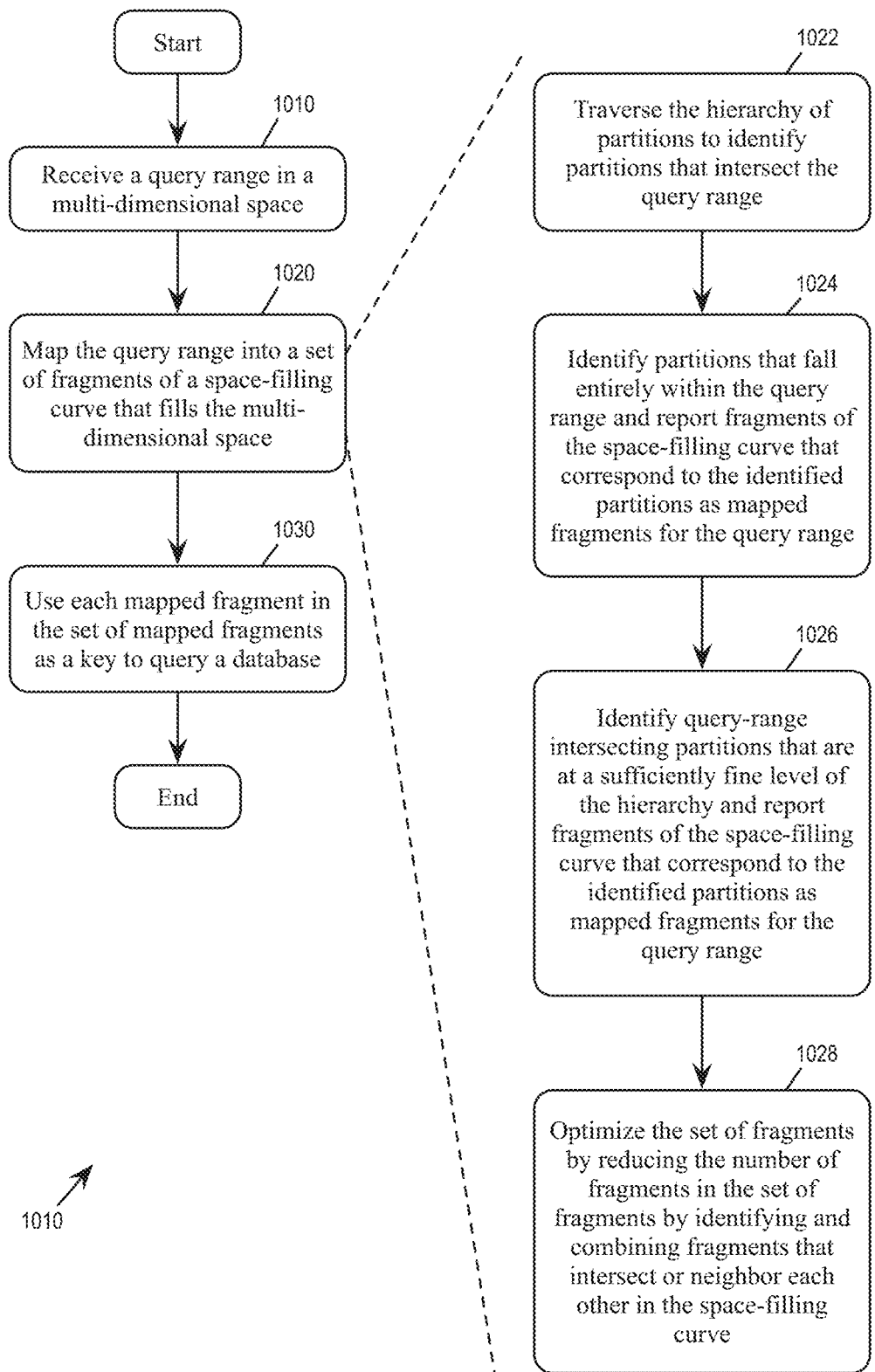
FIG. 10 conceptually illustrates a process for querying a database of context objects by mapping the range of the query to fragments along a space-filling curve.

FIG. 10 conceptually illustrates a process 1000 for querying a database of context objects by mapping the range of the query to fragments along a space-filling curve. The space-filling curve fills a multi-dimensional space in which the context objects exist. If the multi-dimensional space has three dimensions, the 3D space-filling curve (such as the 3D Hilbert curve 799) is used. The multi-dimensional space is recursively partitioned into a hierarchy of partitions at multiple levels. Each level of partitions includes partitions that are ordered according to the space-filling curve, wherein each partition of a level is sub-divided into a further level of partitions.

In some embodiments, one or more processing units (e.g., processor) of a computing device implementing the database system 200 (e.g., the server computing device 210) perform the process 1000 by executing instructions stored in a computer readable medium.

The process 1000 starts when the database system receives (at 1010) a query range in a multi-dimensional space. The query range can be part of a query request that also specifies a query subject or other types of query keys. For a multi-dimensional space that has spatial dimension(s) and temporal dimension, the query range can specify a spatial object that moves or changes over a period of time. FIG. 3 above depicts an example query request.

The database system maps (at 1020) the query range into a set of fragments of the space-filling curve. The database system uses (at 1030) each mapped fragment in the set of mapped fragments as a key to query the context objects from the database. The process 1000 then ends.

The database system performs the step 1020 to map the query range into the set of fragments by performing one or more of steps 1032, 1034, 1036, and 1038.

At 1032, the database system traverses the hierarchy of the partitions to identify partitions that intersect the query range.

At 1034, the database system identifies partitions that fall entirely within the query range. The database system reports fragments of the space-filling curve that correspond to these identified partitions as mapped fragments for the query range. In some embodiments, once a partition is determined to be entirely within the query range, the database system does not traverse beyond the partition into its sub-partitions.

At the 1036, the database system identifies query-range intersecting partitions that are at a sufficiently granular level of the hierarchy. The database system reports fragments of the space-filling curve that correspond to the identified partitions as mapped fragments for the query range. A partition is at a sufficiently granular level of the hierarchy if it has a spatial or temporal resolution that is acceptable to the system or the database application, even if the partition does not fall entirely within the query range.

At the 1038, the database system optimizes the set of fragments by reducing the number of fragments in the set of fragments by identifying and combining fragments that intersect or neighbor each other in the space-filling curve. The set of fragments being optimized includes fragments that corresponds to partitions that fall entirely within the query range (from 1034) as well as fragments that intersect the query range at an acceptable level of resolution (from 1036). Since each query segment causes the database system to perform one query operation, the database system can reduce the number of queries and hence improve performance by reducing the number of fragments.

The following is an example of optimization of query fragments. A particular query range is mapped into at least the following fragments of the space-filling curve (3D Hilbert):

| Fragment A | Start | 6-7-3-1-6-6-0-3-4-5-0-5-5-7-3-7-4-6-... |
|---|---|---|
|  | End | 6-7-3-1-6-6-0-3-4-5-0-5-5-7-3-7-5-1-... |
| Fragment B | Start | 6-7-3-1-6-6-0-3-4-5-0-5-5-7-3-7-6-6-... |
|  | End | 6-7-3-1-6-6-0-3-4-5-0-5-5-7-3-7-7-7-... |
| Fragment C | Start | 6-7-3-1-6-6-3-6-5-6-0-6-1-3-2-2-2-0-... |
|  | End | 6-7-3-1-6-6-3-6-5-6-0-6-1-3-2-2-5-7-... |

Without optimization, the three fragments correspond to three different query operations. At the current level of resolution, the three fragments do not intersect and cannot be optimized. However, if the resolution level is lowered such that the fragments do intersect or neighbor:

| Fragment A | Start | 6-7-3-1-6-6-0-3-4-5-0-5-5-7-3-7-4 |
|---|---|---|
|  | End | 6-7-3-1-6-6-0-3-4-5-0-5-5-7-3-7-5 |
| Fragment B | Start | 6-7-3-1-6-6-0-3-4-5-0-5-5-7-3-7-6 |
|  | End | 6-7-3-1-6-6-0-3-4-5-0-5-5-7-3-7-7 |
| Fragment C | Start | 6-7-3-1-6-6-3-6-5-6-0-6-1-3-2-2-2 |
|  | End | 6-7-3-1-6-6-3-6-5-6-0-6-1-3-2-2-5 |

At this resolution level, Fragment A and Fragment B can be merged such that the system may perform one less query operation.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 10) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
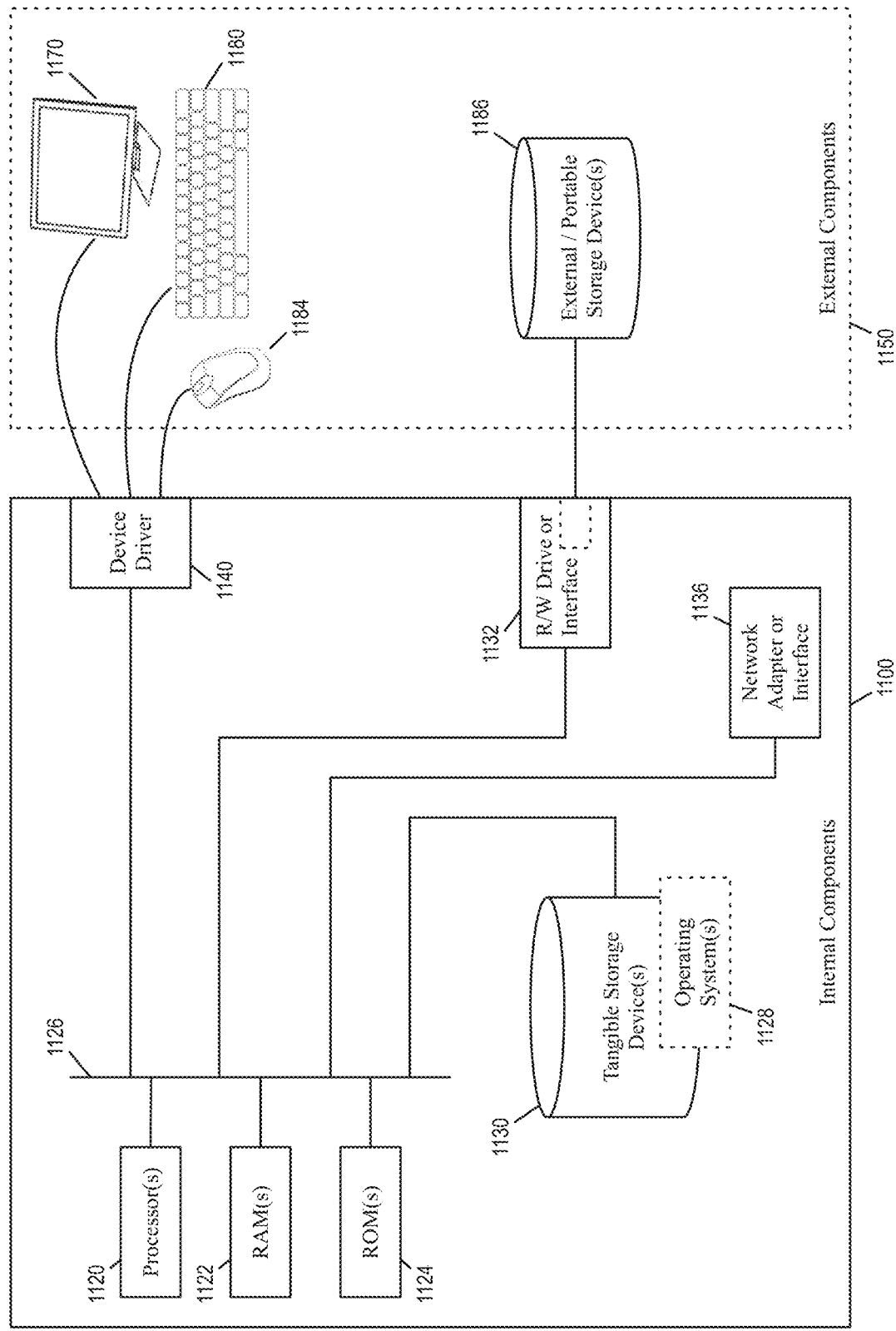
FIG. 11 shows a block diagram of the components of a data processing system in accordance with an illustrative embodiment of the present disclosure.

FIG. 11 shows a block diagram of the components of data processing systems 1100 and 1150 that may be used to implement virtual change manager of a database system in accordance with an illustrative embodiment of the present disclosure. It should be appreciated that FIG. 11 provides only an illustration of one implementation and does not imply any limitations with regard to the environments in which different embodiments may be implemented. Many modifications to the depicted environments may be made based on design and implementation requirements.

Data processing systems 1100 and 1150 are representative of any electronic device capable of executing machine-readable program instructions. Data processing systems 1100 and 1150 may be representative of a smart phone, a computer system, PDA, or other electronic devices. Examples of computing systems, environments, and/or configurations that may represented by data processing systems 1100 and 1150 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 1100 and 1150 may include a set of internal components 1100 and a set of external components 1150 illustrated in FIG. 11. The set of internal components 1100 includes one or more processors 1120, one or more computer-readable RAMs 1122 and one or more computer-readable ROMs 1124 on one or more buses 1126, and one or more operating systems 1128 and one or more computer-readable tangible storage devices 1130. The one or more operating systems 1128 and programs such as the programs for executing the process 1000 are stored on one or more computer-readable tangible storage devices 1130 for execution by one or more processors 1120 via one or more RAMs 1122 (which typically include cache memory). In the embodiment illustrated in FIG. 11, each of the computer-readable tangible storage devices 1130 is a magnetic disk storage device of an internal hard drive. Alternatively, each of the computer-readable tangible storage devices 1130 is a semiconductor storage device such as ROM 1124, EPROM, flash memory or any other computer-readable tangible storage device that can store a computer program and digital information.

The set of internal components 1100 also includes a R/W drive or interface 1132 to read from and write to one or more portable computer-readable tangible storage devices 1186 such as a CD-ROM, DVD, memory stick, magnetic tape, magnetic disk, optical disk or semiconductor storage device. The instructions for executing the process 1000 can be stored on one or more of the respective portable computer-readable tangible storage devices 1186, read via the respective R/W drive or interface 1132 and loaded into the respective hard drive 1130.

The set of internal components 1100 may also include network adapters (or switch port cards) or interfaces 1136 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 1136. From the network adapters (or switch port adaptors) or interfaces 1136, the instructions and data of the described programs or processes are loaded into the respective hard drive 1130. The network may comprise copper wires, optical fibers, wireless transmission, routers, firewalls, switches, gateway computers and/or edge servers.

The set of external components 1150 can include a computer display monitor 1170, a keyboard 1180, and a computer mouse 1184. The set of external components 1150 can also include touch screens, virtual keyboards, touch pads, pointing devices, and other human interface devices. The set of internal components 1100 also includes device drivers 1140 to interface to computer display monitor 1170, keyboard 1180 and computer mouse 1184. The device drivers 1140, R/W drive or interface 1132 and network adapter or interface 1136 comprise hardware and software (stored in storage device 1130 and/or ROM 1124).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising: receiving a query range in a multi-dimensional space;
mapping the query range into a set of fragments of a space-filling curve that fills the multi-dimensional space comprising at least three-dimensions;
and using each mapped fragment in the set of mapped fragments as a key to query a database for different types of context objects of cognitive internet of things (IoT) contexts stored in a computer readable storage medium,
wherein mapping the query range into the set of fragments comprises:
determining whether a partition of the query-range has a predetermined spatial and temporal resolution;
and based on the determination that the partition of the query range has the predetermined spatial and temporal resolution, optimizing the set of fragments by reducing the number of fragments in the set of fragments by identifying and combining fragments that intersect each other in the space-filling curve, the optimizing comprising:
determining a current level of resolution of the set of fragments that intersect each other in the space-filling curve;
and reducing the resolution of the set of fragments such that one or more fragments in the set of fragments can be merged.

2. The computer-implemented method of claim 1: wherein the multi-dimensional space comprises two spatial dimensions and one temporal dimension, and wherein the space-filling curve is a three-dimensional (3D) Hilbert space-filling curve.

3. The computer-implemented method of claim 1: wherein the context objects are mapped to the space-filling curve, and wherein using a mapped fragment of the set of mapped fragments as a key to query the database comprises identifying one or more context objects that intersect the mapped fragment at the space-filling curve.

4. The computer-implemented method of claim 1: wherein the multi-dimensional space is recursively partitioned into a hierarchy of partitions at multiple levels, wherein each level of partitions includes partitions that are ordered according to the space-filling curve, and wherein each partition of a level is sub-divided into a further level of partitions.

5. The computer-implemented method of claim 4, wherein mapping the query range into fragments of the space-filling curve comprises: identifying partitions that fall entirely within the query range; and reporting fragments of the space-filling curve that correspond to the identified partitions as mapped fragments for the query range.

6. The computer-implemented method of claim 4, wherein mapping the query range into fragments of the space-filling curve comprises: identifying partitions that are at a particular level of the partitions that intersect the query range; and reporting fragments of the space-filling curve that correspond to the identified partitions as mapped fragments for the query range.

7. The computer-implemented method of claim 6: wherein reporting a fragment comprises identifying a sequence of one or more order values, and wherein each order value in the sequence corresponds to a position of a partition at a level of the space-filling curve.

8. A computing device comprising: a processor; a first storage device storing a set of instructions, wherein an execution of the set of instructions by the processor configures the computing device to perform acts, comprising:
receiving a query range in a multi-dimensional space comprising at least three-dimensions;
mapping the query range into a set of fragments of a space-filling curve that fills the multi-dimensional space;
and using each mapped fragment in the set of mapped fragments as a key to query a database for different types of context objects of cognitive internet of things (IoT) contexts;
and a second storage device storing the context objects of the database, wherein mapping the query range into the set of fragments comprises:
determining whether a partition of the query-range has a predetermined spatial and temporal resolution;
and based on the determination that the partition of the query range has the predetermined spatial and temporal resolution, optimizing the set of fragments by reducing the number of fragments in the set of fragments by identifying and combining fragments that intersect each other in the space-filling curve, the optimizing comprising:
determining a current level of resolution of the set of fragments that intersect each other in the space-filling curve;
and reducing the resolution of the set of fragments such that one or more fragments in the set of fragments can be merged.

9. The computing device of claim 8: wherein the database comprises context objects that are mapped to the space-filling curve, and wherein using a mapped fragment to query the database comprises identifying one or more context objects that intersect the mapped fragment at the space-filling curve.

10. The computing device of claim 8: wherein the multi-dimensional space is recursively partitioned into a hierarchy of partitions at multiple levels, wherein each level of partitions of the set of mapped fragments as a key includes partitions that are ordered according to the space-filling curve, and wherein each partition of a level is sub-divided into a further level of partitions.

11. The computing device of claim 10, wherein mapping the query range into fragments of the space-filling curve comprises: identifying partitions that fall entirely within the query range; and reporting fragments of the space-filling curve that correspond to the identified partitions, as mapped fragments for the query range.

12. The computing device of claim 10, wherein mapping the query range into fragments of the space-filling curve comprises: identifying partitions that are at a particular level of the partitions that intersect the query range; and reporting fragments of the space-filling curve that correspond to the identified partitions as mapped fragments for the query range.

13. A computer program product comprising: a non-transitory computer-readable storage device having program instructions stored thereon, the program instructions being executable by a processor, the program instructions comprising sets of instructions for:
receiving a context object having a context range in a multi-dimensional space comprising at least three-dimensions;
mapping the context range into a set of fragments of a space-filling curve that fills the multi-dimensional space;
and storing the context object in a database of different types of context objects of cognitive internet of things (IoT) contexts by using each mapped fragment as an index, wherein the set of instructions for mapping the context range into the set of fragments comprises sets of instructions for:
determining whether a partition of the query-range has a predetermined spatial and temporal resolution;

and based on the determination that the partition of the query range has the predetermined spatial and temporal resolution, optimizing the set of fragments by reducing the number of fragments in the set of fragments by identifying and combining fragments that intersect each other in the space-filling curve, the optimizing comprising:

determining whether a partition of the query-range is at a sufficiently granular level of hierarchy;

and optimizing the set of fragments by reducing the number of fragments in the set of fragments by identifying and combining fragments that intersect each other in the space-filling curve.

14. The computer program product of claim 13: wherein the multi-dimensional space comprises two spatial dimensions and one temporal dimension, and wherein the space-filling curve is a three-dimensional (3D) Hilbert space-filling curve.

15. The computer program product of claim 13: wherein the multi-dimensional space is recursively partitioned into a hierarchy of partitions at multiple levels, wherein each level of partitions includes partitions that are ordered according to the space-filling curve, and wherein each partition of a level is sub-divided into a further level of partitions.

16. The computer program product of claim 15, wherein the set of instructions for mapping the context range into fragments of the space-filling curve further comprises sets of instructions for: identifying partitions that fall entirely within the context range; and reporting fragments of the space-filling curve that correspond to the identified partitions as mapped fragments for the context range.

17. The computer program product of claim 15, wherein the set of instructions for mapping the context range into fragments of the space-filling curve comprises sets of instructions for: identifying partitions that are at a particular level of the partitions that intersect the context range; and reporting fragments of the space-filling curve that correspond to the identified partitions as mapped fragments for the context range.

* * * * *